(12) United States Patent
Hecht

(10) Patent No.: US 12,403,532 B2
(45) Date of Patent: Sep. 2, 2025

(54) CUTTING MEMBER, HOLDING DEVICE AND CUTTING TOOL WITH ARRANGEMENT FOR INDICATING ROTATIONAL ALIGNMENT BETWEEN CUTTING MEMBER AND HOLDING DEVICE

(71) Applicant: ISCAR, LTD., Tefen (IL)

(72) Inventor: Gil Hecht, Nahariya (IL)

(73) Assignee: ISCAR, LTD., Tefen (IL)

( * ) Notice: Subject to any disclaimer, the term of this patent is extended or adjusted under 35 U.S.C. 154(b) by 988 days.

(21) Appl. No.: 17/220,099

(22) Filed: Apr. 1, 2021

(65) Prior Publication Data

US 2022/0314334 A1    Oct. 6, 2022

(51) Int. Cl.
  *B23B 25/06*   (2006.01)
  *B23Q 17/22*   (2006.01)

(52) U.S. Cl.
  CPC .......... *B23B 25/06* (2013.01); *B23Q 17/2225* (2013.01)

(58) Field of Classification Search
  CPC ................ B23B 25/06; B23Q 17/2225; B23Q 17/2216; B23Q 2716/008;
  (Continued)

(56) References Cited

U.S. PATENT DOCUMENTS 3,470,618 A * 10/1969 Richer .................. G01B 7/02
                                                    33/639
3,873,915 A *  3/1975 Hayes ................. G01R 31/52
                                                    324/506

(Continued)

FOREIGN PATENT DOCUMENTS

CN    112387997 A  *  2/2021  ............ B23B 25/06
DE       755363 C  *  1/1951
(Continued)

OTHER PUBLICATIONS

International Search Report dated Jun. 30, 2022, issued in PCT counterpart application (No. PCT/IL2021/050247).
Written Opinion dated Jun. 30, 2022, issued in PCT counterpart application (No. PCT/IL2021/050247).

*Primary Examiner* — Ryan Rufo
(74) *Attorney, Agent, or Firm* — Womble Bond Dickinson (US) LLP

(57) ABSTRACT

A cutting tool includes a cutting member having a shank portion located in a clamping recess of a clamping sleeve adaptor of a holding device. The shank portion has a peripheral shank surface including a switching arrangement including two circumferentially spaced apart circumferential outer portions and a circumferential inner portion extending therebetween. The circumferential inner portion has opposite electrical conductivity to the two circumferential outer portions. The holding device has an alignment indicating unit including an electric switch including two spaced apart conductive switch members configured to be in electrically conductive communication or non-communication with each other thereby closing or opening the electric switch, so that an electric circuit established or broken, forming first and second states of the cutting tool, respectively. Switching between the first and second states is realized by rotation of the cutting member with respect to the clamping sleeve adaptor.

31 Claims, 7 Drawing Sheets

(58) Field of Classification Search
CPC ............ B23Q 2717/003; B23Q 17/006; B23Q 17/0909; B23Q 17/0919; B23Q 17/0957; Y10T 82/2572; F21V 33/0084
USPC .............................................. 33/639; 408/16
See application file for complete search history.

(56) References Cited

U.S. PATENT DOCUMENTS

| | | | | |
|---|---|---|---|---|
| 4,770,568 | A * | 9/1988 | Perez | G05B 19/4065 702/34 |
| 4,826,370 | A * | 5/1989 | Conradsson | G05B 19/18 33/642 |
| 4,881,858 | A * | 11/1989 | Volk | G05B 19/18 33/642 |
| 5,175,532 | A * | 12/1992 | Wojciechowski | B23B 49/003 250/559.3 |
| 6,401,348 | B1 * | 6/2002 | Cavanaugh | G01B 5/25 33/645 |
| 6,481,939 | B1 * | 11/2002 | Gillespie | B23Q 17/2241 408/1 R |
| 8,028,435 | B2 * | 10/2011 | Basett | B23Q 17/2225 82/59 |
| 8,517,642 | B2 * | 8/2013 | Borunda | B25B 23/00 324/67 |
| 9,120,237 | B2 * | 9/2015 | Staines | B26B 11/008 |
| 9,782,865 | B2 * | 10/2017 | Richt | B25H 1/0092 |
| 9,873,161 | B2 * | 1/2018 | Tsai | B23K 3/08 |
| 10,086,440 | B2 * | 10/2018 | Buck | B23B 29/0341 |
| 10,254,104 | B2 | 4/2019 | Eichelberger et al. | |
| 10,717,133 | B2 | 7/2020 | Standal et al. | |
| 10,814,403 | B2 * | 10/2020 | Rebholz | B25H 1/0078 |
| 11,007,581 | B2 * | 5/2021 | Vezzoli | B23B 29/205 |
| 2002/0035902 | A1 | 3/2002 | Ericksson et al. | |
| 2011/0249426 | A1 * | 10/2011 | Chen | B25B 23/18 362/119 |
| 2015/0049467 | A1 * | 2/2015 | Thompson | B25B 15/02 362/120 |
| 2024/0139824 | A1 * | 5/2024 | Imai | B23B 25/06 |

FOREIGN PATENT DOCUMENTS

| | | | | |
|---|---|---|---|---|
| DE | 3702268 | A1 * | 8/1988 | |
| DE | 3916759 | A1 * | 12/1989 | |
| DE | 202006006342 | U1 * | 6/2006 | ......... B23Q 17/2225 |
| DE | 102016223201 | A1 * | 5/2018 | |
| FR | 1458412 | | 3/1966 | |
| GB | 1001046 | A * | 8/1965 | |
| JP | 60150947 | A * | 8/1985 | |
| RU | 166877 | U1 * | 12/2016 | ............. B23B 25/06 |
| WO | WO 95/35179 | | 12/1995 | |

\* cited by examiner

CUTTING MEMBER, HOLDING DEVICE AND CUTTING TOOL WITH ARRANGEMENT FOR INDICATING ROTATIONAL ALIGNMENT BETWEEN CUTTING MEMBER AND HOLDING DEVICE

FIELD OF THE INVENTION

The subject matter of the present application relates to cutting tools having a cutting member releasably clamped in a recess formed in a clamping sleeve of a holding device, and further in particular to such cutting tools having an electronic means for indicating rotational alignment of the cutting member with respect to the holding device.

BACKGROUND OF THE INVENTION

Cutting tools can include a holding device having a clamping sleeve and a cutting member having a cylindrical shank portion releasably clamped in a clamping recess located on the clamping sleeve. Prior to clamping, the cutting tool can have a means for indicating rotational alignment of the cutting member with respect to the holding device (specifically, the clamping sleeve). Rotational alignment of the cutting member with respect to the holding device is realized when the height of cutting edge is positioned so that it engages with the center of the work-piece.

An example of such a cutting tool is disclosed in, for example, US2002/0035902A1, having a cutting tool system which includes a clamping device and a cutting tool mounted therein. The cutting tool carries a cutting edge and includes a shaft clamped within an aperture of the clamping device. Prior to being clamped, the shaft is movable relative to the clamping device in either a longitudinal or rotational direction, in order to locate the cutting edge in a desired position. Either the clamping device or the cutting tool carries a spring-loaded device which engages a recess formed in the other of the cutting tool and clamping device when the cutting tool and its cutting edge are in a desired position, to provide an indication that the cutting tool is in such desired position by providing a sudden increase in a force necessary to displace the cutting tool out of such desired position.

Another example is disclosed in U.S. Pat. No. 10,254,104 B2, having an apparatus and method for center height alignment of a boring bar. The apparatus includes a seat member with a bottom and a back, and a digital angle gauge mounted to the seat member. The method includes the steps of: assembling an apparatus comprising a seat member and a digital angle gauge; calibrating the apparatus such that a Display of the digital angle gauge reads zero degrees; and aligning the center height of the boring bar by rotating the boring bar such that the Display of the digital angle gauge reads zero degrees when the apparatus is mounted onto the boring bar.

Yet another example is disclosed in U.S. Pat. No. 10,717,133 B2, having a cutting tool, and a turning machine including the cutting tool. The cutting tool includes a tool bar extending along an axis, a cutting head located at the tool bar, and at least one sensor integrated with the tool bar or the cutting head. A rotational orientation of the cutting tool with respect to the axis is estimated based on output provided by the at least one sensor. In at least some embodiments, the at least one sensor includes accelerometers configured to measure acceleration in at least two directions.

SUMMARY OF THE INVENTION

In accordance with a first aspect of the subject matter of the present application there is provided a holding device comprising: a clamping sleeve adaptor, extending along a sleeve central axis, and an alignment indicating unit located at the clamping sleeve adaptor; wherein:
the clamping sleeve adaptor comprises:
a radially outward facing sleeve peripheral surface extending circumferentially about the sleeve central axis, the sleeve peripheral surface intersecting, and forming a boundary of, a forward sleeve end surface at a forward sleeve end of the clamping sleeve adaptor; and
a clamping recess, extending along a recess central axis, the clamping recess comprising a recess peripheral surface which extends circumferentially about the recess central axis and which opens out to the forward sleeve end surface; and
the alignment indicating unit comprises an alignment indicating unit housing and an electric circuit located therewithin, the electric circuit comprising:
a power supply unit;
an indicator; and
an electric switch, for turning the indicator on and off, the electric switch comprising two spaced apart conductive switch members protruding from the alignment indicating unit housing towards the recess central axis, the switch members configured to be in electrically conductive communication or non-communication with each other, thereby closing or opening the electric switch so that the electric circuit is established or broken, respectively.

In accordance with a second aspect of the subject matter of the present application there is provided A cutting tool comprising:
a holding device of the type describe above; and
a cutting member, having a cutting member longitudinal axis defining opposite forward to rearward directions and opposite rotational preceding and succeeding directions, the cutting member comprising:
a cutting portion comprising a cutting edge;
a shank portion formed axially opposite, and rearward of, the cutting portion; and
two axially opposite cutting member end surfaces and a cutting member peripheral surface extending therebetween and about the cutting member longitudinal axis, the cutting member peripheral surface at the shank portion being cylindrical and forming a peripheral shank surface; and
a switching arrangement located at the peripheral shank surface and comprising two circumferentially spaced apart circumferential outer portions and a circumferential inner portion extending therebetween, the circumferential inner portion having opposite electrical conductivity to the two circumferential outer portions; wherein:
the shank portion is located in the clamping recess of the holding device.

In accordance with a third aspect of the subject matter of the present application there is provided A cutting member, having a cutting member longitudinal axis defining opposite forward to rearward directions and opposite rotational preceding and succeeding directions, the cutting member comprising:
- a cutting portion comprising a cutting edge;
- a shank portion formed axially opposite, and rearward of, the cutting portion; and
- two axially opposite cutting member end surfaces and a cutting member peripheral surface extending therebetween and about the cutting member longitudinal axis, the cutting member peripheral surface at the shank portion being cylindrical and forming a peripheral shank surface; and
- a switching arrangement located at the peripheral shank surface and comprising two circumferentially spaced apart circumferential outer portions and a circumferential inner portion extending therebetween, the circumferential inner portion having opposite electrical conductivity to the two circumferential outer portions; and
- a conductive substrate and a non-conductive external element formed on part of the conductive substrate; wherein:
  - the conductive substrate forms the circumferential inner portion and the non-conductive external element forms the two circumferential outer portions, or
  - the conductive substrate forms the two circumferential outer portions and the non-conductive external element forms the circumferential inner portion.

It is understood that the above-said is a summary, and that features described hereinafter may be applicable in any combination to the subject matter of the present application, for example, any of the following features may be applicable to the holding device, cutting tool or cutting member:

The recess peripheral surface can have a cylindrical shape.

The two conductive switch members can be located outside the clamping recess.

The recess peripheral surface can open out to the forward sleeve end surface at a clamping recess opening. In a front view of the holding device, the two conductive switch members can extend, in a direction towards the recess central axis, at least to the clamping recess opening.

The two conductive switch members can be spring loaded.

The alignment indicating unit can be releasably attached to the clamping sleeve adaptor.

The clamping sleeve adaptor can comprise a sleeve flange adjacent the forward sleeve end surface. The alignment indicating unit can be releasably attached to the clamping sleeve adaptor at the sleeve flange.

The indicator can comprise an indicating light.

Rach of the two conductive switch members can have a switch member contact surface subtending a switch member contact angle at the recess central axis.

The two conductive switch members can be axially spaced apart along the recess central axis by a switch member axial distance. The two conductive switch members can be circumferentially aligned about the recess central axis.

The two conductive switch members can be angularly spaced apart about the recess central axis by a switch member circumferential angle.

The cutting tool can be adjustable between a first state and a second state.

In the first state of the cutting tool:
- the cutting member can be oriented in a first rotated position about the cutting member longitudinal axis;
- the two conductive switch members can be electrically connected to one another by whichever one of the inner and two circumferential outer portions is conductive so that the two conductive switch members are in electrically conductive communication with each other; and
- the electric switch can be closed, the electric circuit can be established and the indictor can be on.

In the second state of the cutting tool:
- the cutting member can be oriented in a second rotated position about the cutting member longitudinal axis, the first and second rotated positions being different from each other;
- at least one of the two conductive switch members can be spaced apart from whichever one of the inner and two circumferential outer portions is conductive so that the two conductive switch members are not in electrically conductive communication with each other; and
- the electric switch can be open, the electric circuit can be broken and the indicator (84) can be off.

The circumferential inner portion can be conductive and the two circumferential outer portions can be non-conductive. In the first state of the cutting tool, the two switch members can both contact the circumferential inner portion. The first state of the cutting tool can indicate rotational alignment between the cutting member and the holding device.

The circumferential inner portion can be non-conductive and the two circumferential outer portions can be conductive. In the first state of the cutting tool, the two switch members can both contact one of the two circumferential outer portions. The first state of the cutting tool (20) can indicate rotational non-alignment between the cutting member and the holding device.

The first state of the cutting tool can be realized when the cutting member is rotationally oriented within a first state tolerance angle with respect to the clamping sleeve adaptor about the cutting member longitudinal axis.

The two conductive switch members can be circumferentially aligned about the recess central axis. Each of the two conductive switch members can have a switch member contact surface subtending a switch member contact angle at the recess central axis. The circumferential inner portion can subtend an inner portion angle at the cutting member longitudinal axis. The first state tolerance angle can have a value equal to the switch member contact angle plus twice the inner portion angle.

The two conductive switch members can be angularly spaced apart about the recess central axis by a switch member circumferential angle. The circumferential inner portion can subtend an inner portion angle at the cutting member longitudinal axis. The switch member circumferential angle can be less than the inner portion angle. The first state tolerance angle can have a value equal to the inner portion angle minus the switch member circumferential angle.

In the second state of the cutting tool, at least one of the two conductive switch members can be in entire contact with whichever one of the inner and two circumferential outer portions is non-conductive.

The circumferential inner portion can be conductive and the two circumferential outer portions can be non-conductive.

The cutting tool can further comprise a conductive substrate and a non-conductive external element formed on part of the conductive substrate. The conductive substrate can form the circumferential inner portion and the non-conductive external element can form the two circumferential outer portions or the conductive substrate can form the two circumferential outer portions and the non-conductive external element can form the circumferential inner portion.

The non-conductive external element can be a coated layer formed on part of the conductive substrate.

The conductive substrate can be formed from steel.

The peripheral shank surface can comprise a peripheral groove. The non-conductive external element can be located in the peripheral groove.

The circumferential inner portion can be elongated and extend in a direction from one of cutting member end surfaces towards the other.

The circumferential inner portion can extend parallel to the cutting member longitudinal axis.

The circumferential inner portion may not extend to the cutting member end surface located at the shank portion.

The circumferential inner portion can subtend an inner portion angle at the cutting member longitudinal axis. The inner portion angle can be greater than or equal to 5° and less than or equal to 10.

The cutting member can comprise an additional switching arrangement located at the peripheral shank surface, such that the cutting member has two switching arrangements which are rotationally offset from each other about the cutting member longitudinal axis.

The two switching arrangements can be rotationally offset from each other about the cutting member longitudinal axis by 180°.

The two circumferential outer portions can comprise a rotationally preceding circumferential outer portion extending from the circumferential inner portion in the rotationally preceding direction and a rotationally succeeding circumferential outer portion extending from the circumferential inner portion in the rotationally succeeding direction. The rotationally preceding circumferential outer portion and the rotationally succeeding circumferential outer portion can intersect each other distal the circumferential inner portion.

The cutting edge can be formed at the intersection of a rake surface and a relief surface. The rotationally preceding direction can have a tangential component direction at the cutting edge, the rake surface facing generally in the tangential component direction. The cutting member can have a longitudinal plane containing the cutting member longitudinal axis and intersecting the cutting edge. The switching arrangement can be located on the side of the longitudinal plane that extends therefrom in the tangential component direction.

The cutting member can be releasably clamped in the clamping recess of the clamping sleeve adaptor of the holding device. The alignment indicating unit can be detached from the clamping sleeve adaptor.

the conductive substrate can form the circumferential inner portion and the non-conductive external element can form the two circumferential outer portions.

The non-conductive external element can be a coated layer formed on part of the conductive substrate.

BRIEF DESCRIPTION OF THE FIGURES

For a better understanding of the present application and to show how the same may be carried out in practice, reference will now be made to the accompanying drawings, in which.

Figure 1:
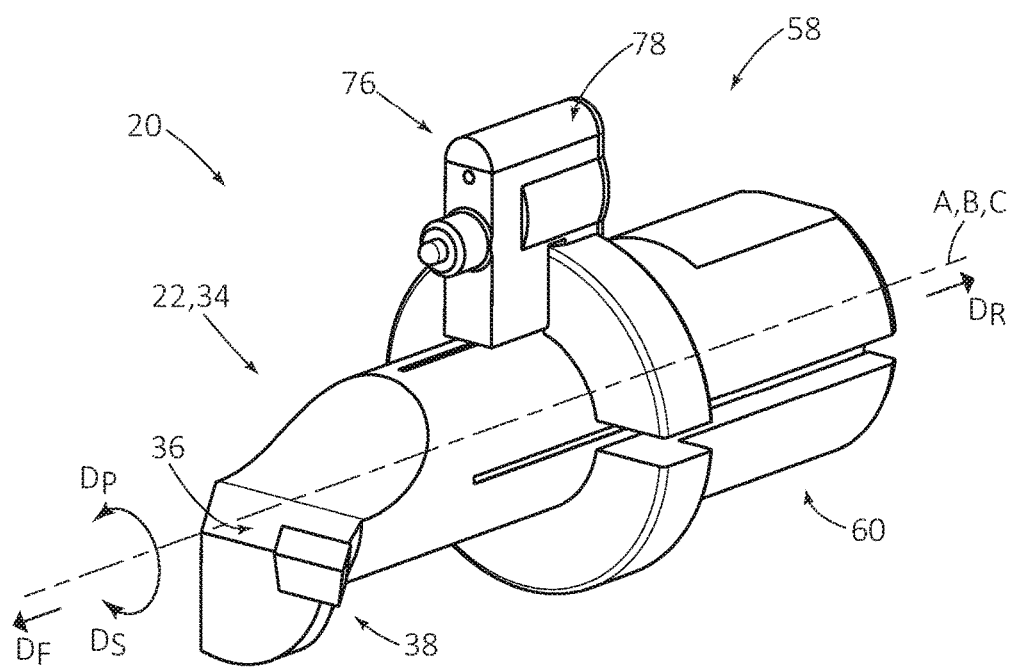
FIG. 1 is a perspective view of a cutting tool in accordance with a first embodiment of the present application.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 2:
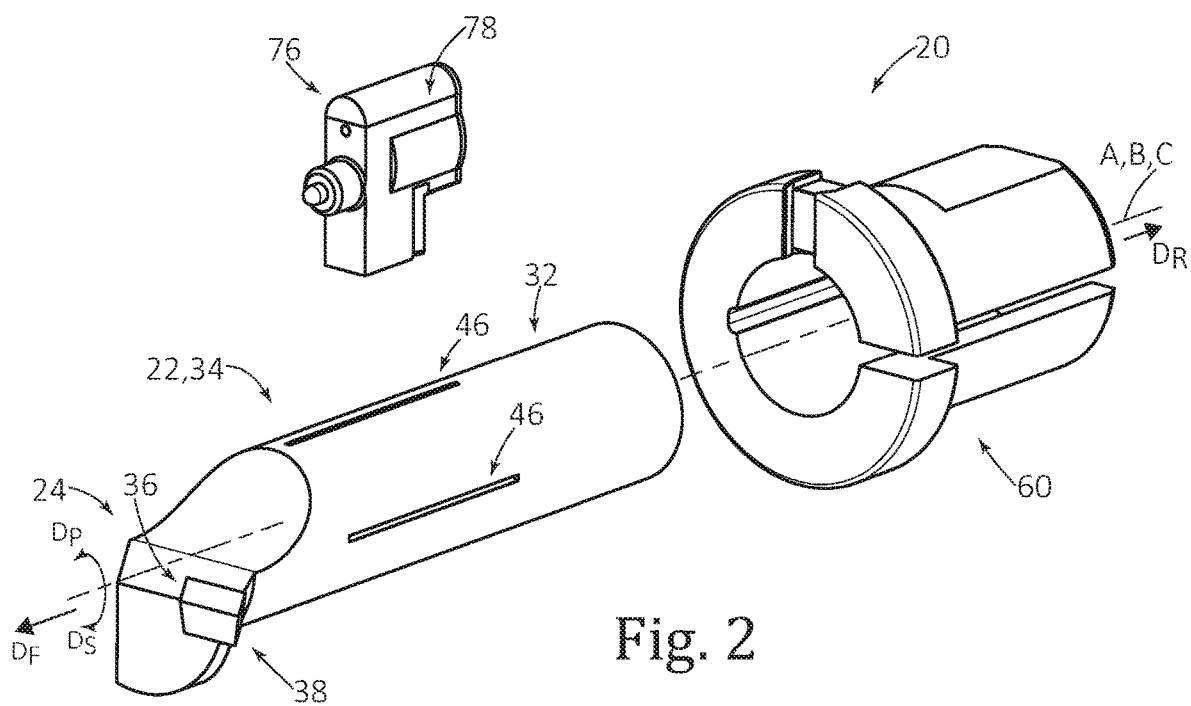
FIG. 2 is an exploded perspective view of the cutting tool shown in FIG. 1.

Attention is first drawn to FIGS. 1 and 2 showing a cutting tool 20, for chip removal, in accordance with embodiments of the subject matter of the present application. The cutting tool 20 can be a turning tool, being fixed while a work-piece rotates during cutting operations.

Figure 3:
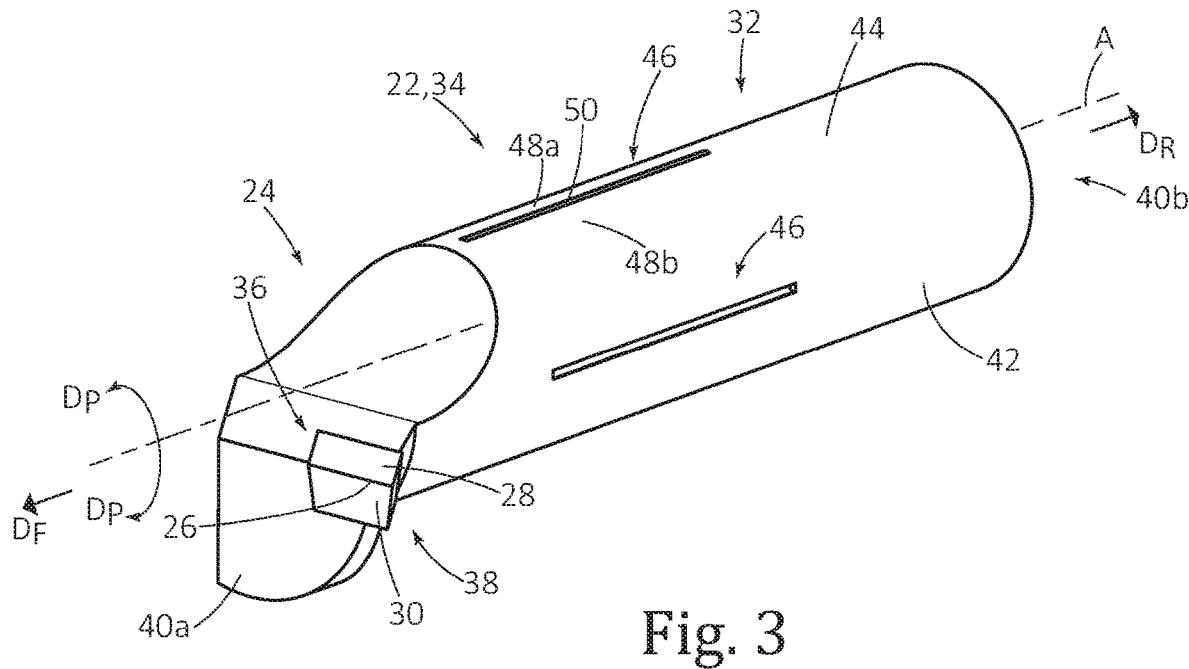
FIG. 3 is a perspective view of a cutting member shown in FIGS. 1 and 2.

Referring in particular to FIG. 3, the cutting tool 20 includes a cutting member 22. The cutting member 22 has a cutting member longitudinal axis A which defines opposite forward and rearward directions $D_F$, $D_R$. It should be noted that use of the terms "forward" and "rearward" throughout the description and claims refer to a relative position in a direction of the cutting member longitudinal axis A towards the left and right, respectively, in FIG. 4. In the present disclosure, "forward" is associated with the cutting end of the rotary cutting tool 20. It should also be noted that use of the terms "axial" and "radial" throughout the description and claims are with respect to the cutting member longitudinal axis A, unless otherwise stated. The cutting member longitudinal axis A also defines opposite rotational preceding and succeeding directions $D_P$, $D_S$. It should further be noted that use of the terms "rotational preceding" and "rotational succeeding" throughout the description and claims refer to a relative position in a direction of the cutting member longitudinal axis A clockwise and counter-clockwise, respectively, in FIG. 5.

Figure 4:
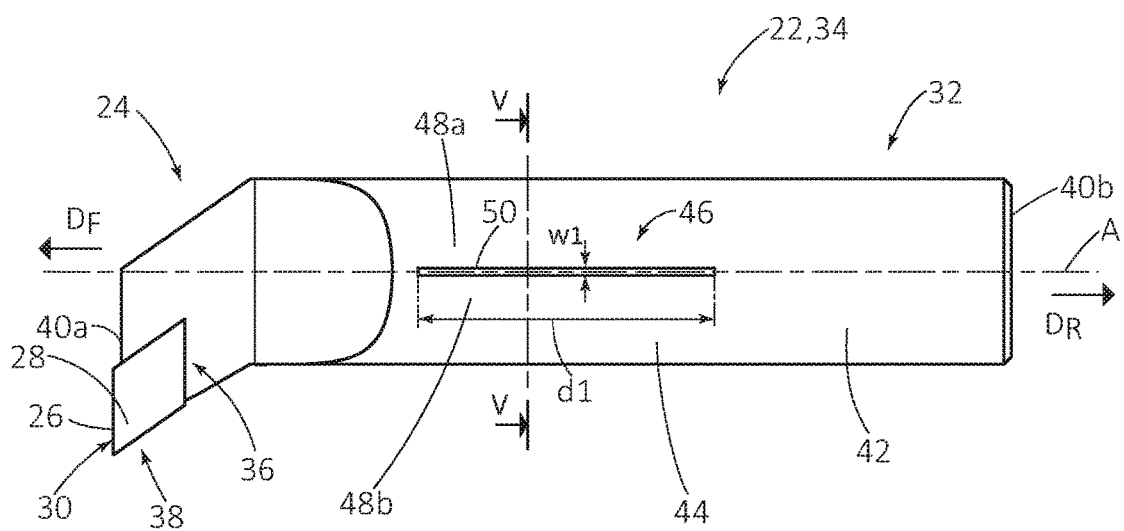
FIG. 4 is a top view of the cutting member shown in FIG. 3.
Figure 5:
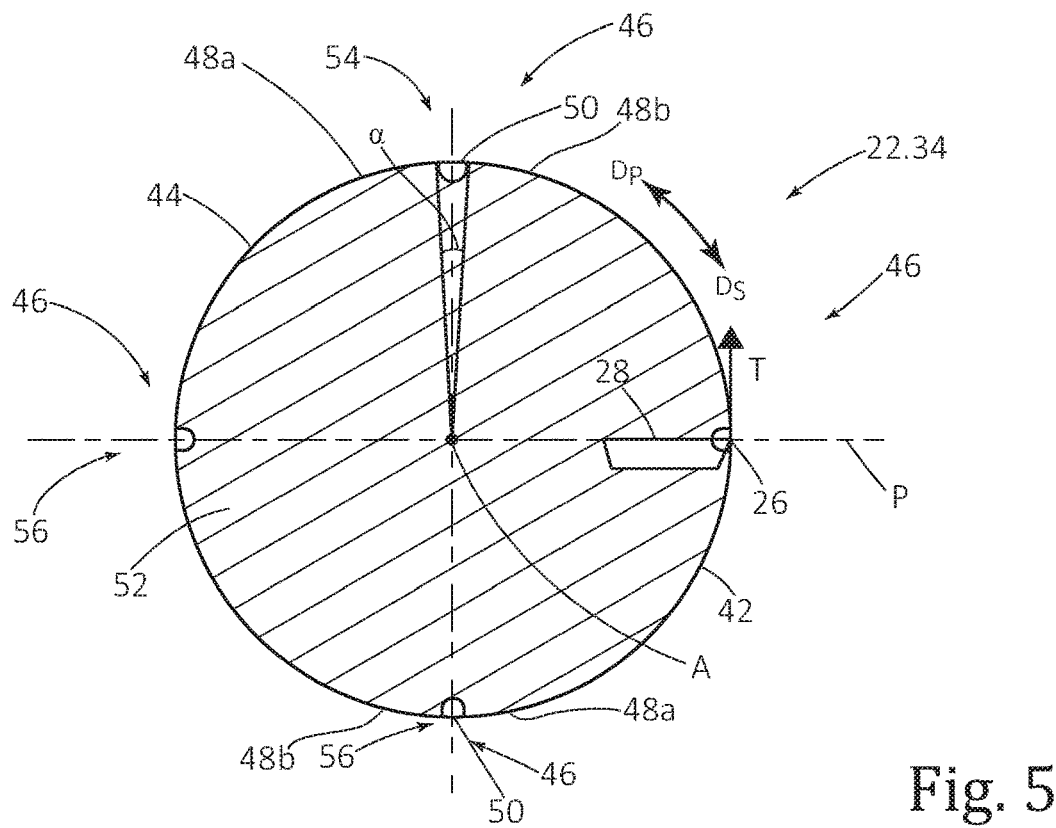
FIG. 5 is a cross-sectional view of the cutting member taken along the line V-V in FIG. 4, with a cutting insert superimposed.

As seen in FIGS. 3 and 4, the cutting member 22 includes cutting portion 24. The cutting portion 24 includes a cutting edge 26, designed for metal cutting. The cutting edge 26 is formed at the intersection of a rake surface 28 and a relief surface 30. The rotationally preceding direction $D_P$ has a tangential component direction T at the cutting edge 26. Referring to FIG. 5, in accordance with some embodiments of the subject matter of the present application, the rake surface 28 can face generally in the tangential component direction T. The relief surface 30 can face generally in the forward direction $D_F$. The cutting member 22 has a longitudinal plane P containing the cutting member longitudinal axis A and intersecting the cutting edge 26.

The cutting member 22 includes a shank portion 32 formed axially opposite, and rearward of, the cutting portion 24. That is to say, the cutting member 22 extends from the shank portion 32 to the cutting portion 24 along the cutting member longitudinal axis A. Part of the shank portion 32 is designed to be clamped by a clamping sleeve adaptor, as described later in the description.

It is noted that, in this non-limiting example shown in the drawings, the cutting member 22 can include an insert holder 34 having a holder pocket 36 at the cutting portion 24. A cutting insert 38 can be releasably retained in the holder pocket 36.

The cutting member 22 includes two axially opposite cutting member end surfaces 40a, 40b and a cutting member peripheral surface 42 extending therebetween and about the cutting to member longitudinal axis A. The cutting member longitudinal axis A intersects the two cutting member end surfaces 40a, 40b. One of the two cutting member end surfaces 40a (a forward cutting member end surface) is located at the cutting portion 24 and the other one of the two cutting member end surfaces 40b (a rear cutting member end surface) is located at the shank portion 32. The cutting member peripheral surface 42 at the shank portion 32 is cylindrical and forms a peripheral shank surface 44. In accordance with some embodiments of the subject matter of the present application, the peripheral shank surface 44 can be devoid of flat surfaces which are designed to be clampingly engaged by clamping screws.

The cutting member 22 includes an electrical switching arrangement 46 located at the peripheral shank surface 44. The switching arrangement 46 is designed to provide a means for closing and opening an electric switch located on a separate alignment indicating unit, as described later in the description. As shown in FIG. 5, in accordance with some embodiments of the subject matter of the present application, the switching arrangement 46 can be located on the side of the longitudinal plane P that extends therefrom in the tangential component direction T.

The switching arrangement 46 includes two circumferentially spaced apart, circumferential outer portions 48a, 48b and a circumferential inner portion 50 which extends therebetween. The two circumferential outer portions 48a, 48b are spaced apart from each other in the opposite rotational preceding and succeeding directions $D_P$, $D_S$. At the surface of the cutting member, the circumferential inner portion 50 has an inner portion axial length d1 along the cutting member longitudinal axis A and an inner portion circumferential width w1 in a direction around the cutting member peripheral surface 42. The circumferential outer portions 48a, 48b and the circumferential inner portion 50 are located at the peripheral shank surface 44. In accordance with some embodiments of the subject matter of the present application, the circumferential inner portion 50 can be generally radially level with the two circumferential outer portions 48a, 48b. That is to say, the circumferential inner portion 50 can transition smoothly and continuously with the two circumferential outer portions 48a, 48b. Thus, the circumferential inner portion 50 and the two circumferential outer portions 48a, 48b can lay on the same cylindrical surface as the peripheral shank surface 44. In particular, there may be no stepped arrangement at their intersection forming a recessed region for engaging with, for example, a sphere or cylinder, as disclosed in US2002/0035902A1.

In a switching arrangement 46, two circumferential outer portions 48a, 48b include a rotationally preceding circumferential outer portion 48a which extends from the circumferential inner portion 50 in the rotationally preceding direction $D_P$ and a rotationally succeeding circumferential outer portion 48b which extends from the circumferential inner portion 50 in the rotationally succeeding direction $D_S$.

In accordance with some embodiments of the subject matter of the present application, the cutting member 22 can include a single switching arrangement 46. In such a configuration, the rotationally preceding circumferential outer portion 48a and the rotationally preceding circumferential outer portion 48b can intersect each other distal (e.g. opposite) the circumferential inner portion 50. The rotationally preceding circumferential outer portion 48a and the rotationally succeeding circumferential outer portion 48b can merge smoothly and continuously at their intersection.

In accordance with some other embodiments of the subject matter of the present application, the cutting member 22 can include an additional switching arrangement 46 located at the 46 located at the peripheral shank surface 44, such that the cutting member 22 includes two switching arrangements 46 which can be rotationally offset from each other about the cutting member longitudinal axis A. In such a configuration, the rotationally preceding circumferential outer portion 48a of a first switching arrangement 46 and the rotationally succeeding circumferential outer portion 48b of the additional, second switching arrangement 46 can intersect each other (optionally smoothly and continuously) distal both circumferential inner portions 50. The two switching arrangements 46 can be rotationally offset from each other about the cutting member longitudinal axis A by 180°, as see in FIG. 5.

As seen best in FIG. 4, in accordance with some embodiments of the subject matter of the present application, the circumferential inner portion 50 can be elongated along the cutting member longitudinal axis A and thus extend in a direction from one of cutting member end surfaces 40a, 40b towards the other. The circumferential inner portion 50 can extend parallel to the cutting member longitudinal axis A. The circumferential inner portion 50 may not extend to the cutting member end surface 40a located at the cutting portion 24. The circumferential inner portion 50 may not extend to the cutting member end surface 40b located at the shank portion 32. In other words, the circumferential inner portion 50 is axially spaced apart from both cutting member end surfaces 40a, 40b. Referring to FIG. 5, the circumferential inner portion 50 can subtend an inner portion angle α at the cutting member longitudinal axis A. The inner portion angle α can be greater than or equal to 5° and less than or equal to 10°. Preferably, the inner portion angle α can be greater than or equal to 6.5° and less than or equal to 8.5°.

The circumferential inner portion 50 has opposite electrical conductivity to the two circumferential outer portions 48a, 48b. That is to say, either the circumferential inner portion 50 is electrically conductive and the two circumferential outer portions 48a, 48b are both non-conductive (i.e. electrical insulators), or the circumferential inner portion 50 is non-conductive and the two circumferential outer portions 48a, 48b are both conductive. Stated differently, when the circumferential inner portion 50 is conductive, the two circumferential outer portions 48a, 48b are non-conductive and vice versa. Thus, the circumferential inner portion 50 and the two circumferential outer portions 48a, 48b are neither all conductive nor all non-conductive in a single configuration. In accordance with some embodiments of the subject matter of the present application the circumferential inner portion 50 can be conductive and the two circumferential outer portions 48a, 48b can be non-conductive. In accordance with some other embodiments of the subject matter of the present application the circumferential inner portion 50 can be non-conductive and the two circumferential outer portions 48a, 48b can be conductive. It is understood that the terms "conductivity", "non-conductivity" etc., used in the description, refers to the electrical type of conductivity.

Referring again to FIG. 5, in accordance with some embodiments of the subject matter of the present application, the cutting member 22 can include a conductive substrate 52. The conductive substrate 52 can be formed from steel. The cutting member 22 can include a non-conductive external element 54 formed on part of the conductive substrate 52. The non-conductive external element 54 can transition smoothly with the conductive substrate 52. The non-conductive external element 54 can be non-fluid. The non-conductive external element 54 can be solid. The non-conductive external element 54 can be deformable. For example, the non-conductive external element 54 can be formed from rubber or plastic. In accordance with some other embodiments of the subject matter of the present application, the non-conductive external element 54 can be a coated layer formed on part of the conductive substrate 52.

In accordance with some embodiments of the subject matter of the present application, the conductive substrate 52 can form the circumferential inner portion 50 and the non-conductive external element 54 can form the two circumferential outer portions 48a, 48b. Alternatively, in accordance with some other embodiments of the subject matter of the present application, the conductive substrate 52 can form the two circumferential outer portions 48a, 48b and the non-conductive external element 54 can form the circumferential inner portion 50.

In accordance with some embodiments of the subject matter of the present application, the peripheral shank surface 44 can include a peripheral groove 56. The non-conductive external element 54 can be located in the peripheral groove 56. The non-conductive external element 54 can fill the peripheral groove 56 so as to be flush with the peripheral shank surface 44. In certain other configurations, the non-conductive external element 54 can extend out of the peripheral groove 56. As seen in FIG. 5, in a cross-sectional view of the cutting member taken in a plane perpendicular to the cutting member longitudinal axis A, the peripheral groove 56 has a substantially semicircular shape, which intersects the cutting member peripheral surface 42 at a generally 90° angle.

Figure 6:
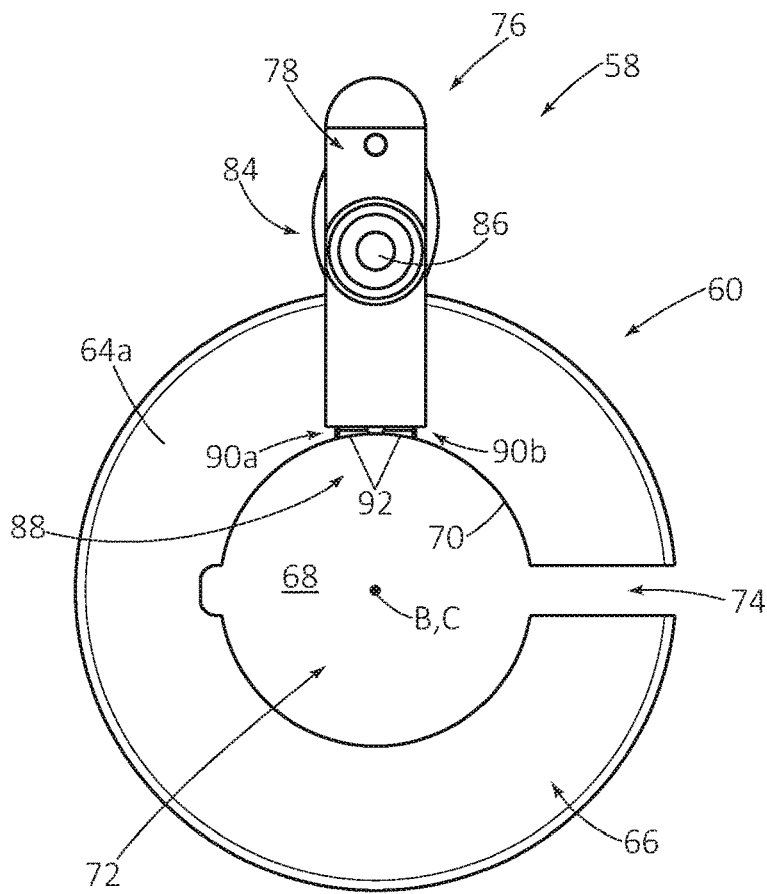
FIG. 6 is a front view of a holding device shown in FIGS. 1 and 2.
Figure 7:
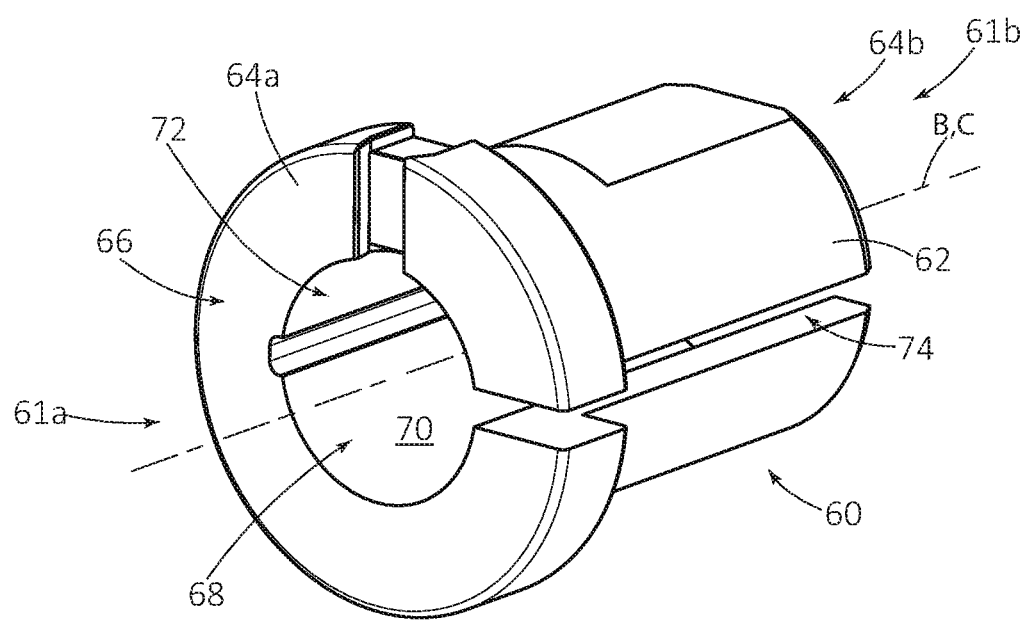
FIG. 7 is a perspective view of a clamping sleeve adaptor shown in FIG. 6.
Figure 8:
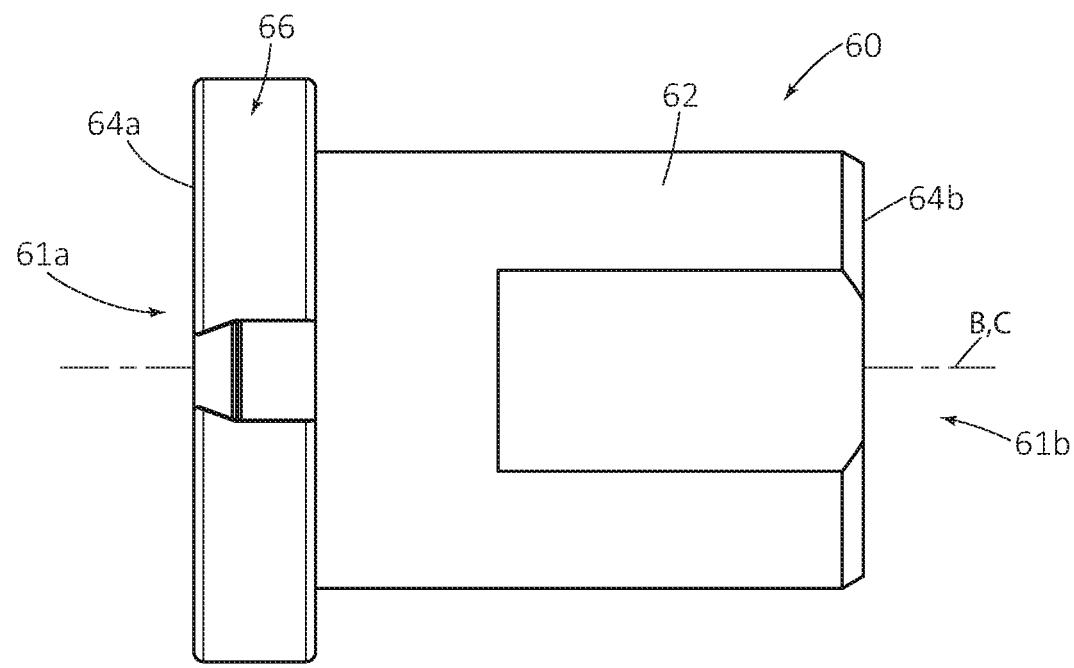
FIG. 8 is a top view of the clamping sleeve adaptor shown in FIG. 7.
Figure 9:
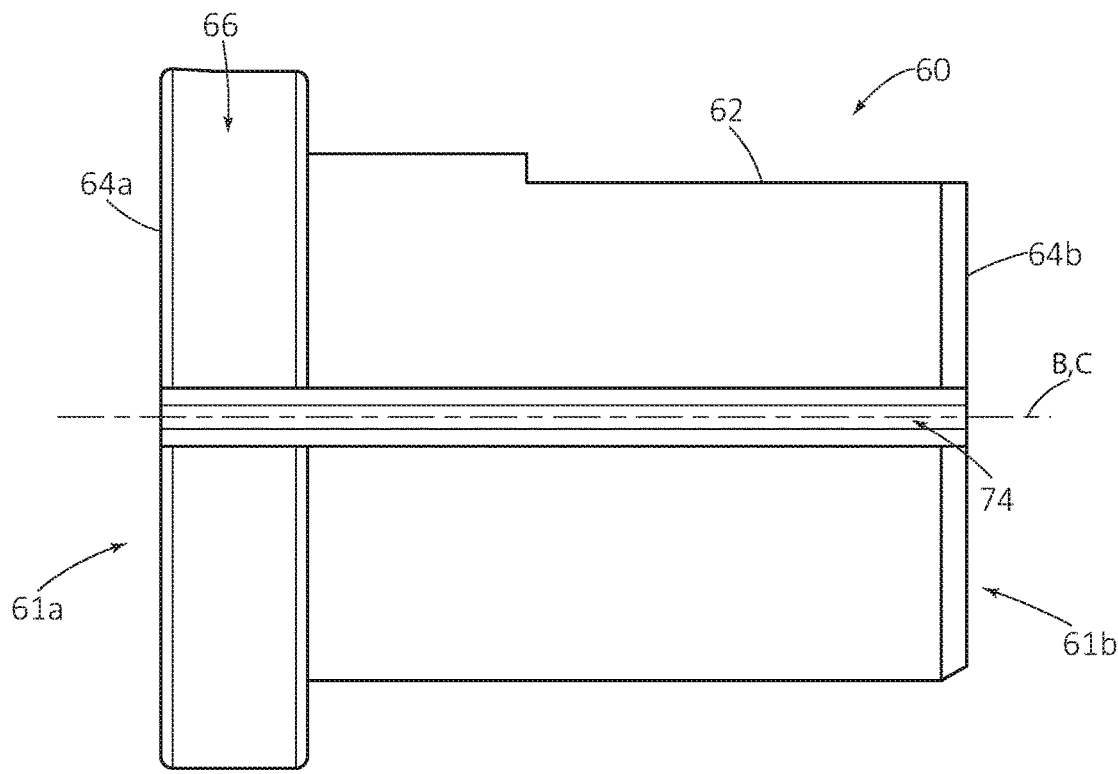
FIG. 9 is a side view of the clamping sleeve adaptor shown in FIG. 7.
Figure 10:
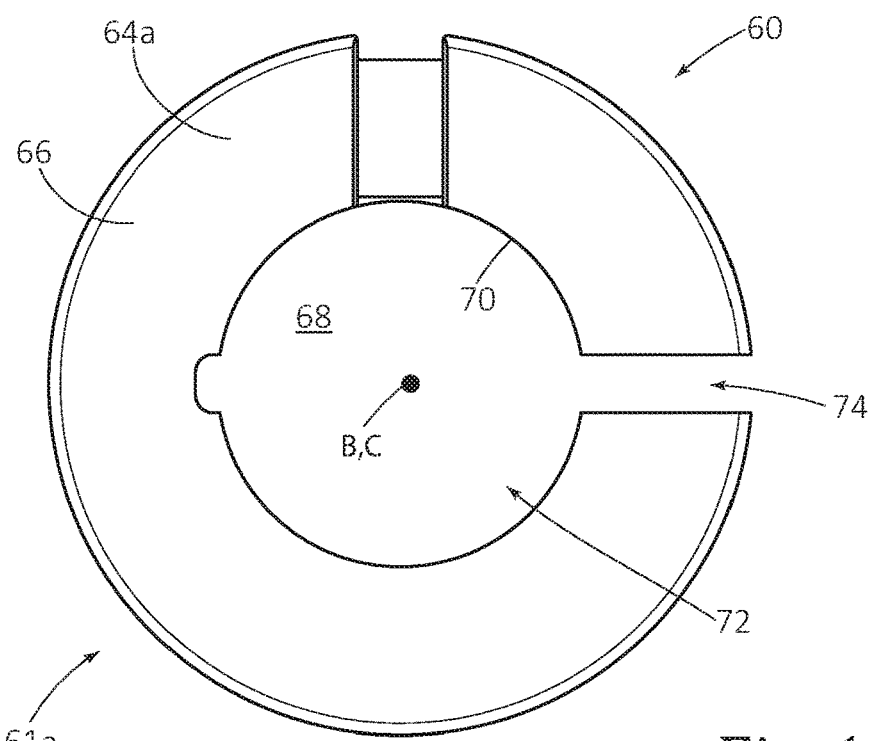
FIG. 10 is a front view of the clamping sleeve adaptor shown in FIG. 7.

Referring to FIG. 6, the cutting tool 20 also has a holding device 58. As shown in FIGS. 7-10, the holding device 58 includes a clamping sleeve adaptor 60. The clamping sleeve adaptor 60 has a sleeve central axis B along which it extends. The clamping sleeve adaptor 60 is typically made from steel. The clamping sleeve adaptor 60 includes a radially outward facing sleeve peripheral surface 62 extending circumferentially about the sleeve central axis B. The sleeve peripheral surface 62 intersects, and forms a boundary of, a forward sleeve end surface 64a at a forward sleeve end 61a of the clamping sleeve adaptor 60. The clamping sleeve adaptor 60 includes a rear sleeve end surface 64b at a rear sleeve end 61b of the clamping sleeve adaptor 60, the rear sleeve end 61b being axially opposite the forward sleeve end 61a with respect to the sleeve central axis B, and rearward of the forward sleeve end 61a. As seen in FIG. 8, in accordance with some embodiments of the subject matter of the present application, clamping sleeve adaptor 60 can include a sleeve flange 66 adjacent the forward sleeve end surface 64a.

The clamping sleeve adaptor 60 includes a clamping recess 68. The clamping recess 68 serves to receive the cutting member 22. The clamping recess 68 has a recess central axis C, along which it extends. The recess central axis C can be parallel to, and optionally co-incident with, the sleeve central axis B. The clamping recess 68 is recessed in the forward sleeve end surface 64a. The clamping recess 68 includes a recess peripheral surface 70 which extends circumferentially about the recess central axis C and which opens out to the forward sleeve end surface 64a at a clamping recess opening 72. The recess peripheral surface 70 is designed to clampingly engage the cutting member 22. In accordance with some embodiments of the subject matter of the present application, the recess peripheral surface 70 can have a shape that corresponds to the cutting member 22 at the shank portion 32. Thus, the recess peripheral surface 70 can have a cylindrical shape. The recess peripheral surface 70 can open out to the rear sleeve end surface 64b. Thus, the clamping recess 68 can be a through recess. The clamping sleeve adaptor 60 can include a sleeve slit 74 which opens out to the recess peripheral surface 70 and the sleeve peripheral surface 62 from the forward sleeve end surface 64a to the rear sleeve end surface 64b. The sleeve slit 74 allows the radial dimension of the clamping recess 68 to be reduced in order to clamp the cutting member 22. It is noted that there may be no through hole which opens out to the recess peripheral surface 70 and the sleeve peripheral surface 62, for receiving a spring-loaded device, as disclosed in US2002/0035902A1.

Figure 11:
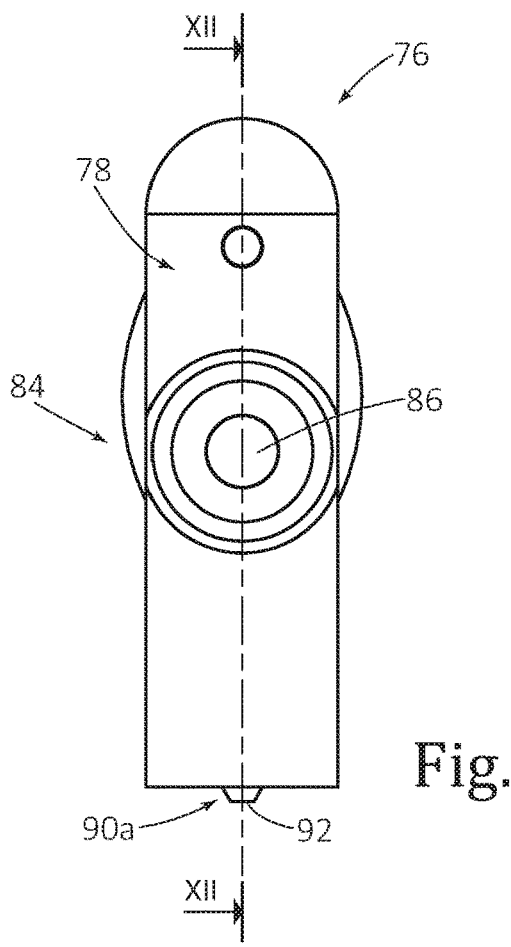
FIG. 11 is a front view of an alignment indicating unit shown in FIGS. 1 and 2.
Figure 12:
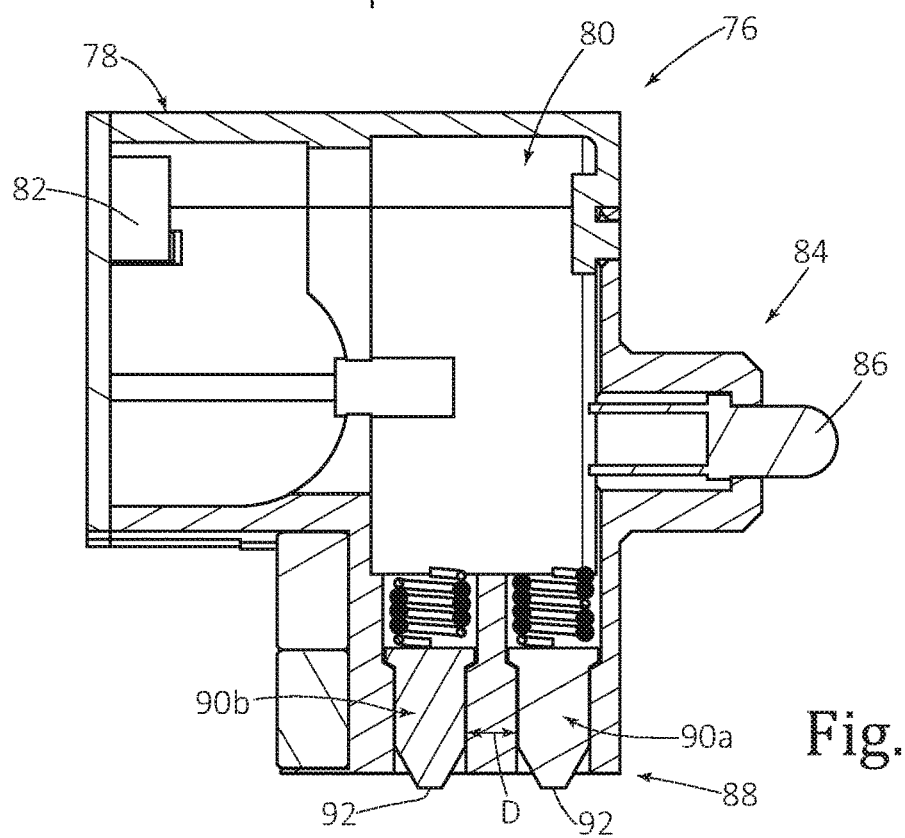
FIG. 12 is a cross-sectional view of the alignment indicating unit taken along the line XII-XII in FIG. 11.

Referring to FIGS. 6 and 11-12, the holding device 58 includes an electronic module in the form of an alignment indicating unit 76 located at the clamping sleeve adaptor 60. In some embodiments (not shown), the alignment indicating unit 76 is non-releasably attached to the clamping sleeve adaptor 60. In the embodiment seen in e.g., FIGS. 1 and 2, the alignment indicating unit 76 is releasably attached to clamping sleeve adaptor 60 and therefore may be detached therefrom. In accordance with some embodiments of the subject matter of the present application, the alignment indicating unit 76 can be releasably attached to the clamping sleeve adaptor 60, preferably at a forward end thereof. The alignment indicating unit 76 can be attached to the clamping sleeve adaptor 60 after the shank portion 32 has been inserted in the clamping recess 68. The alignment indicating unit 76 can be detached from the clamping sleeve adaptor 60 prior to metal-cutting. Advantageously, such removal can prevent damage to the alignment indicating unit 76 during cutting operations. Moreover, chip flow is not obstructed by the alignment indicating unit 76. Further moreover, coolant channel openings (not shown) at the forward sleeve end surface 64a would not be obstructed by the alignment indicating unit 76. In certain configurations, the alignment indicating unit 76 can be releasably attached to the clamping sleeve adaptor 60 at the sleeve flange 66.

The alignment indicating unit 76 includes an alignment indicating unit housing 78. The alignment indicating unit 76 also includes an electric circuit 80 located within the alignment indicating unit housing 78. The electric circuit 80 includes a power supply unit 82. The power supply unit 82 provides power to the electric circuit 80. The power supply unit 82 is preferably a battery though other power sources may also be used.

The electric circuit 80 also includes an indicator 84. The indicator 84 acts to provide an indication to a user that the cutting member 22 is rotationally aligned with respect to clamping sleeve adaptor 60. The indicator 84 can provide a visual indication. For example, the indicator 84 can include an indicating light 86. However, in other embodiments, an audible indicator may be used instead of, or in addition to, a visual indicator.

The electric circuit 80 also includes an electric switch 88. The electric circuit 80 can be established (i.e. the electric circuit 80 can be completed) or broken when the electric switch 88 is closed or opened, respectively, in order to operate the indicator 84. The electric switch 88 includes two spaced apart conductive switch members 90a, 90b. The two conductive switch members 90a, 90b protrude from the alignment indicating unit housing 78 towards the recess central axis C. The two conductive switch members 90a, 90b are configured to be in electrically conductive communication or non-communication with each other thereby closing or opening the electric switch 88, respectively.

In accordance with some embodiments of the subject matter of the present application, the two conductive switch members 90a, 90b are located outside the clamping recess 68. In a front view of the holding device 58, the two conductive switch members 90a, 90b can extend, in a direction towards the recess central axis C, at least to the clamping recess opening 72. In the same view, the two conductive switch members 90a, 90b can overlap the clamping recess opening 72. The two conductive switch members 90a, 90b can be pins, elongated in a direction towards the recess central axis C. Referring to FIG. 12, in accordance with some embodiments of the subject matter of the present application, the two conductive switch members 90a, 90b can be axially spaced apart along the recess central axis C by a switch member axial distance D.

In accordance with some embodiments of the subject matter of the present application, the two conductive switch members 90a, 90b can be circumferentially aligned about recess central axis C. In accordance with some other embodiments of the subject matter of the present application, the two conductive switch members 90a, 90b can be angularly spaced apart about the recess central axis C by a switch member circumferential angle β.

In accordance with some embodiments of the subject matter of the present application, the two conductive switch members 90a, 90b can be spring loaded. The two conductive switch members 90a, 90b can be identical. Each of the two conductive switch members 90a, 90b can have a switch member contact surface 92, for contact with the two circumferential outer portions 48a, 48b and the circumferential inner portion 50. The switch member contact surface 92 subtends a switch member contact angle γ at the recess central axis C. Specifically, the switch member contact angle γ is subtended by circumferential extremities of the switch member contact surface 92. The switch member contact surface 92 can have a shape complementary to the two circumferential outer portions 48a, 48b and the circumferential inner portion 50. Alternatively, the switch member contact surface 92 can be convexly curved. For example, the switch member contact surface 92 can have a frusto-spherical shape. Contact between the switch member contact surface 92 and the two circumferential outer portions 48a, 48b and the circumferential inner portion 50 can be point-contact.

Reference is now reverted to FIGS. 1-2, showing the cutting tool 20, in accordance with the subject matter of a third aspect of the present application. The cutting tool 20 includes the cutting member 22 releasably clamped in the clamping recess 68 of the clamping sleeve adaptor 60 of the holding device 58 forming an assembled position of the cutting tool 20. In accordance with some embodiments of the subject matter of the present application, the sleeve central axis B can be co-incident with the cutting member longitudinal axis A.

To realize the assembled position of the cutting tool 20, the shank portion 32 is inserted in the clamping recess 68. After insertion, the shank portion 32 is located in the clamping recess 68 of the holding device 58. From such a configuration, and prior to realizing the assembled position of the cutting tool 20, the cutting tool 20 can be adjustable between a first state in which the indicator light is on, and a second state in which the indicator light is off.

In the first state of the cutting tool 20, the cutting member 22 is oriented in a first rotated position about the cutting member longitudinal axis A. The two conductive switch members 90a, 90b are electrically connected to one another (i.e. are in electrically conductive communication with each other) by whichever one of the circumferential inner portion 50 and the two circumferential outer portions 48a, 48b is conductive, thereby closing the electric switch 88 so that the electric circuit 80 is established. Upon the electric circuit 80 being established, the indicator 84 is turned on.

In the second state of the cutting tool 20, the cutting member 22 is oriented in a second rotated position about the cutting member longitudinal axis A. The first and second rotated to positions being different from each other. The two conductive switch members 90a, 90b are not electrically connected to one another, the electric switch 88 is open, and the indicator light is off.

In embodiments of a first cutting member type in which the circumferential inner portion 50 is conductive and the two circumferential outer portions 48a, 48b are non-conductive, in the first state of the cutting tool 20, the two switch members 90a, 90b both contact the circumferential inner portion 50. A closed electric circuit 88 (i.e., the first state) indicates that the cutting member 22 is rotationally aligned with respect to the clamping sleeve adaptor 60. At such a stage, the cutting member 22 can be tightly clamped into the clamping recess 68, thereby being ready for metal cutting operations.

Furthermore, in embodiments of the first cutting member type, the first state of the cutting tool 20 can be realized when the cutting member 22 is rotationally oriented within a first state tolerance angle θ with respect to the clamping sleeve adaptor 60 about the cutting member longitudinal axis A. The first state tolerance angle θ can be subtended by first and second arc end points E1, E2 of a first state arc F at the cutting member longitudinal axis A. The value of the first state tolerance angle θ determines the angular range over which the indicator 84 indicates either rotational alignment or non-alignment between the cutting member 22 and the holding device 58 (i.e. specifically, the clamping sleeve adaptor 60).

In contrast, in embodiments of a second cutting member type in which the circumferential inner portion 50 is non-conductive and the two circumferential outer portions 48*a*, 48*b* are conductive, in the first state of the cutting tool 20, the two switch members 90*a*, 90*b* both contact one of the two circumferential outer portions 48*a*, 48*b*. A closed electric circuit 88 (i.e., the first state) indicates that the cutting member 22 is rotationally non-aligned with respect to the clamping sleeve adaptor 60.

Figure 13:
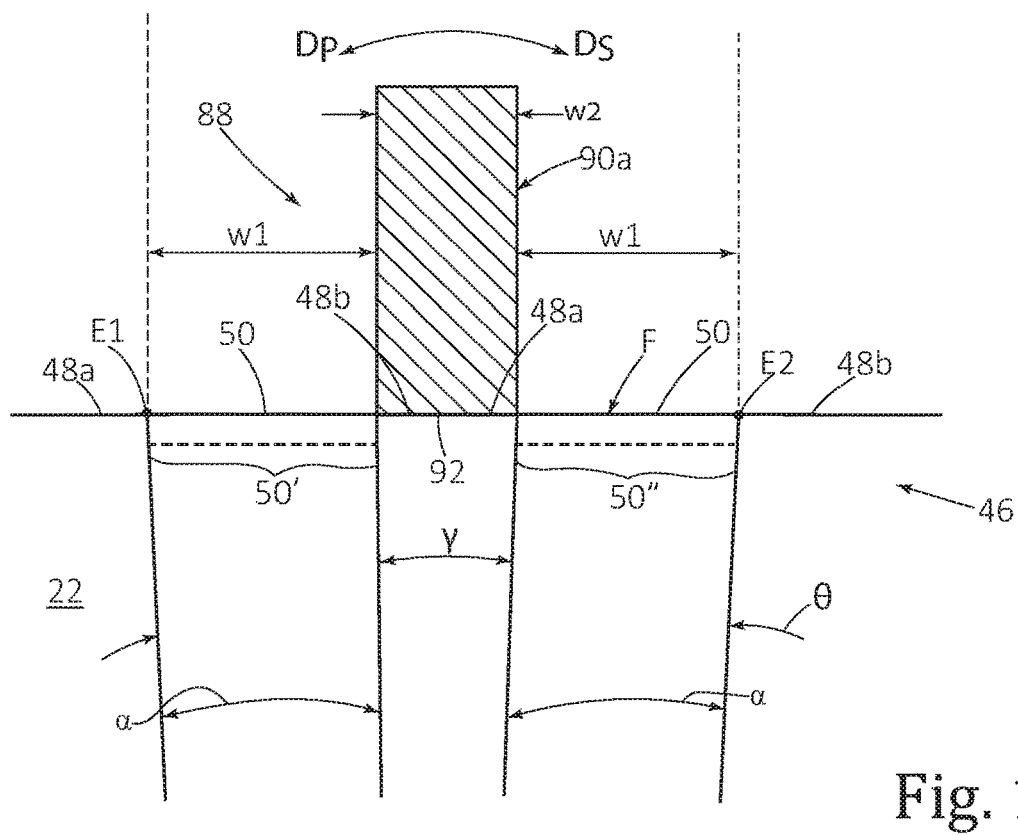
FIG. 13 is a schematic cross-sectional view of two conductive switch members and a switching arrangement, in a radial plane therethrough, showing two opposing threshold positions, in accordance with a first embodiment of the present application.
Figure 14:
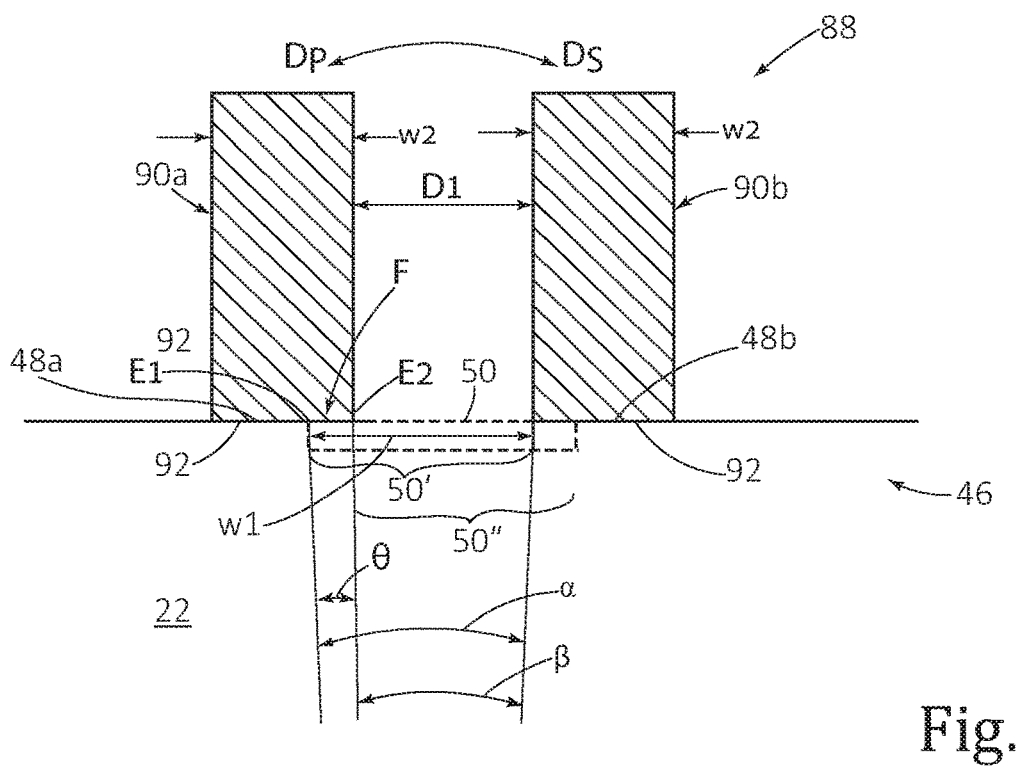
FIG. 14 is a schematic cross-sectional view of two conductive switch members and a switching arrangement, in a radial plane therethrough, showing two opposing threshold positions, in accordance with a second embodiment of the present application.

Reference is now made to FIGS. 13 and 14 representing schematic cross-sectional views of two conductive switch members and a switching arrangement, in a radial plane through two conductive switch members and the switching arrangement, showing two opposing threshold positions. The two opposing threshold positions represent position where the cutting tool 20 transforms from the first state to the second state when the cutting member 22 is rotated in the rotational preceding and succeeding directions $D_P$, $D_S$, respectively. In particular, it is noted that the circumferential inner portion 50 and the two circumferential outer portions 48*a*, 48*b* are depicted as straight lines in these figures, when in reality they are defined by a radius. Furthermore, in FIGS. 13 and 14, the conductive switch members 90*a*, 90*b* are shown as having cross-sections of constant switch member circumferential width w2 and constant axial spacing D, along their heights, rather than having tapering proximate their contact surface 92, as seen in FIG. 12.

FIG. 13 shows the configuration where the two conductive switch members 90*a*, 90*b* are circumferentially aligned about the recess central axis C (so only the forwardmost one is visible). The first arc end point E1 (i.e. the leftmost arc end point) is defined by a rotationally preceding-most point (i.e. leading point in the rotational preceding direction $D_P$) on the circumferential inner portion 50' in a first position at the moment the circumferential inner portion 50' loses contact with the two conductive switch members 90*a*, 90*b* as the cutting member 22 is rotated in the rotational preceding direction $D_P$. The second arc end point E2 (i.e. the rightmost arc end point) is defined by a rotationally succeeding-most point (i.e. a leading point in the rotational succeeding direction $D_S$) on the circumferential inner portion 50" in a second position at the moment the circumferential inner portion 50" loses contact with the two conductive switch members 90*a*, 90*b* as the cutting member 22 is rotated in the rotational succeeding direction $D_S$. The first state tolerance angle θ can have a value equal to the switch member contact angle γ plus twice the inner portion angle α. In FIG. 13, at the surface of the cutting member 22, the switch member circumferential width w2 of the two conducting switch members 90*a*, 90*b* is more important in contacting the circumferential inner portion 50 to close the switch, than the switch member axial distance D (as shown in FIG. 12) between the two conducting switch members 90*a*, 90*b*. This is because the axial lengths of the circumferential inner and outer portions is several times longer than the switch member axial distance D.

Referring to FIG. 14, in order to make the alignment indication more precise the first state tolerance angle θ can be reduced. An example of such a configuration is one having the two conductive switch members 90*a*, 90*b* angularly spaced apart (i.e., circumferentially spaced apart) about the recess central axis C by a switch member circumferential angle β. The switch member circumferential angle β can be less than the inner portion angle α. In FIG. 14, at the surface of the cutting member 22, the circumferentially spaced apart switch members 90*a*, 90*b* are spaced apart from one another by a switch member circumferential distance D1 while the circumferential inner portion 50 again has the inner portion circumferential width w1. It can be seen from FIG. 14 that, at the surface of the cutting member 22, the inner portion circumferential width w1 of the to circumferential inner portion 50 must be greater than the switch member circumferential distance D1 between the two conductive switch members 90*a*, 90*b*, i.e., w1>D1.

Still referring to FIG. 14, the first arc end point E1 (i.e. the leftmost arc end point) is defined by a rotationally preceding-most point (i.e. a leading point in the rotational preceding direction $D_P$) on the circumferential inner portion 50' in the first position at the moment the circumferential inner portion 50' loses contact with the conductive switch member 90*b* that leads in the rotational succeeding direction $D_S$, as the cutting member 22 is rotated in the rotational preceding direction $D_P$. The second arc end point E2 (i.e. the rightmost arc end point) is defined by a rotationally preceding-most point (i.e. a leading point in the rotational preceding direction $D_P$—that is, the same point as used for the first arc end point E1) on the circumferential inner portion 50" in the second position at the moment the circumferential inner portion 50" loses contact with the conductive switch member 90*a* that leads in the rotational preceding direction $D_P$, as the cutting member 22 is rotated in the rotational succeeding direction $D_S$. It is noted that the circumferential inner portion 50', 50" shown in the first and second positions overlap each other (unlike in FIG. 13). The first state tolerance angle θ can have a value equal to the inner portion angle α minus the switch member circumferential angle β. It is noted that in this configuration, the first state tolerance angle θ is not dependent on the switch member contact angle γ. In FIG. 14, in a first cutting member type, the switch member circumferential width w2 is not as important in completing the circuit by contacting the circumferential inner portion 50, as compared to the axial spacing D between the two conducting switch members 90*a*, 90*b*.

In accordance with some embodiments of the subject matter of the present application, the second state of the cutting tool 20 can be realized by rotating the cutting member 22 about the cutting member longitudinal axis A with respect to the clamping sleeve adaptor 60 (i.e. in the rotational preceding or succeeding directions $D_P$, $D_S$. In the second state of the cutting tool 20, at least one of the two conductive switch members 90*a*, 90*b* can be spaced apart from whichever one of the circumferential inner portion 50 and the two circumferential outer portions 48*a*, 48*b* is conductive. i.e. the two conductive switch members 90*a*, 90*b* are not electrically connected to one another by whichever one of the circumferential inner portion 50 and the two circumferential outer portions 48*a*, 48*b* is conductive so that the two conductive switch members 90*a*, 90*b* are not in electrically conductive communication with each other, thereby opening the electric switch 88 so that the electric circuit 80 is broken. Upon the electric circuit 80 being broken, the indicator 84 to can be turned off, indicating that the cutting member 22 is rotationally misaligned with respect to clamping sleeve adaptor 60. At least one of the two conductive switch members 90*a*, 90*b* can be in entire contact with whichever one of the circumferential inner portion 50 and the two circumferential outer portions 48*a*, 48*b* is non-conductive.

Although the subject matter of the present application has been described to a certain degree of particularity, it should be understood that various alterations and modifications could be made without departing from the spirit or scope of the invention as hereinafter claimed. For example, the cutting member 22 can be integrally formed with the shank portion 32 having a one-piece construction with cutting portion 24. The cutting member 22 can be made from cemented carbide. Moreover, in the configuration where the circumferential inner portion 50 is non-conductive, the non-conductive external element 54 can be formed by an air-gap.

What is claimed is:

1. A holding device (58) comprising:
  a clamping sleeve adaptor (60), extending along a sleeve central axis (B), and an alignment indicator (76) attached to the clamping sleeve adaptor (60); wherein:
  the clamping sleeve adaptor (60) comprises:
    a radially outward facing sleeve peripheral surface (62) extending circumferentially about the sleeve central axis (B), the sleeve peripheral surface (62) intersecting, and forming a boundary of, a forward sleeve end surface (64a) at a forward sleeve end (61a) of the clamping sleeve adaptor (60); and
    a clamping recess (68), extending along a recess central axis (C), the clamping recess (68) comprising a recess peripheral surface (70) which extends circumferentially about the recess central axis (C) and which opens out to the forward sleeve end surface (64a); and
  the alignment indicator (76) comprises an alignment indicator housing (78) and an electric circuit (80) located therewithin, the electric circuit (80) comprising:
  a power supply (82);
  an indicator (84) having an on state configured to indicate a shank portion of a cutting member being received and rotationally aligned in the clamping recess and an off state; and
  an electric switch (88) having a closed configuration corresponding to the on state of the indicator (84) and an open configuration corresponding to the off state of the indicator (84), the electric switch (88) comprising two spaced apart conductive switch members (90a, 90b) protruding from and through the alignment indicator housing (78) towards the recess central axis (C), each of the two switch members (90a, 90b) having a switch member contact surface (92) which is formed on a part of the switch member (90a, 90b) that protrudes from the alignment indicator housing (78), in the closed configuration of the electric switch (88) a first one of the switch member contact surfaces is configured to contact the shank portion received in the clamping recess at a first position and a second one of the switch member contact surfaces is configured to contact the shank portion received in the clamping recess at a second position such that the switch member contact surfaces are in electrically conducive communication with one another through the shank portion, in the open configuration of the electric switch (88) the first one of the switch member contact surfaces is configured to contact the shank portion received in the clamping recess at a third position and the second one of the switch member contact surfaces is configured to contact the shank portion received in the clamping recess at a fourth position such that the switch member contact surfaces are not in electrical communication with one another through the shank portion.

2. The holding device (58), according to claim 1, wherein the recess peripheral surface (70) has a cylindrical shape.

3. The holding device (58), according to claim 1, wherein the two conductive switch members (90a, 90b) are located outside the clamping recess (68).

4. The holding device (58), according to claim 1, wherein:
  the recess peripheral surface (70) opens out to the forward sleeve end surface (64a) at a clamping recess opening (72); and
  in a front view of the holding device (58), the two conductive switch members (90a, 90b) extend, in a direction towards the recess central axis (C), at least to the clamping recess opening (72).

5. The holding device (58), according to claim 1, wherein the two conductive switch members (90a, 90b) are urged away from the alignment indicator (76).

6. The holding device (58), according to claim 1, wherein the alignment indicator (76) is releasably attached to the clamping sleeve adaptor (60).

7. The holding device (58), according to claim 1, wherein:
  the clamping sleeve adaptor (60) comprises a sleeve flange (66) adjacent the forward sleeve end surface (64a); and
  the alignment indicator (76) is releasably attached to the clamping sleeve adaptor (60) at the sleeve flange (66).

8. The holding device (58), according to claim 1, wherein the indicator (84) comprises an indicating light (86).

9. The holding device (58), according to claim 1, wherein each switch member contact surface (92) subtends at a switch member contact angle (γ) at the recess central axis (C).

10. The holding device (58), according to claim 1, wherein:
  the two conductive switch members (90a, 90b) are axially spaced apart along the recess central axis (C) by a switch member axial distance (D); and
  the two conductive switch members (90a, 90b) are circumferentially aligned about the recess central axis (C).

11. The holding device (58), according to claim 1, wherein the two conductive switch members (90a, 90b) are angularly spaced apart about the recess central axis (C) by a switch member circumferential angle (β).

12. The holding device (58), according to claim 1, wherein the recess peripheral surface (70) has a shape configured to correspond to the shank portion of the cutting member.

13. A cutting tool (20) comprising:
  a holding device (58) comprising:
    a clamping sleeve adaptor (60), extending along a sleeve central axis (B), and an alignment indicator (76) attached to the clamping sleeve adaptor (60);
    the clamping sleeve adaptor (60) comprising:
      a radially outward facing sleeve peripheral surface (62) extending circumferentially about the sleeve central axis (B), the sleeve peripheral surface (62) intersecting, and forming a boundary of, a forward sleeve end surface (64a) at a forward sleeve end (61a) of the clamping sleeve adaptor (60); and
      a clamping recess (68), extending along a recess central axis (C), the clamping recess (68) comprising a recess peripheral surface (70) which extends circumferentially about the recess central axis (C) and which opens out to the forward sleeve end surface (64a); and the alignment indicator (76) comprises an alignment indicator housing (78) and an electric circuit (80) located therewithin, the electric circuit (80) comprising:
  a power supply (82);
  an indicator (84) having an on state configured to indicate a shank portion of a cutting member being received and rotationally aligned in the clamping recess and an off state; and
  an electric switch (88) having a closed configuration corresponding to the on state of the indicator (84) and an open configuration corresponding to the off state of the indicator (84), the electric switch (88) comprising two spaced apart conductive switch members (90a, 90b) protruding from the alignment indicator housing (78) towards the recess central axis (C), each of the two switch members (90a, 90b) having a switch member contact surface (92) which is formed on a part of the switch member (90a, 90b) that protrudes from the alignment indicator housing (78), in the closed configuration of the electric switch (88) a first one of the switch member contact surfaces is configured to contact the shank portion received in the clamping recess at a first position and a second one of the switch member contact surfaces is configured to contact the shank portion received in the clamping recess at a second position such that the switch member contact surfaces are in electrically conducive communication with one another through the shank portion, in the open configuration of the electric switch (88) the first one of the switch member contact surfaces is configured to contact the shank portion received in the clamping recess at a third position and the second one of the switch member contact surfaces is configured to contact the shank portion received in the clamping recess at a fourth position such that the switch member contact surfaces are not in electrical communication with one another through the shank portion;
the cutting member (22), having a cutting member longitudinal axis (A) defining opposite forward to rearward directions ($D_F$, $D_R$) and opposite rotational preceding and succeeding directions ($D_P$, $D_S$), the cutting member (22) comprising:
a cutting portion (24) comprising a cutting edge (26);
the shank portion (32) formed axially opposite, and rearward of, the cutting portion (24); and
two axially opposite cutting member end surfaces (40a, 40b) and a cutting member peripheral surface (42) extending therebetween and about the cutting member longitudinal axis (A), the cutting member peripheral surface (42) at the shank portion (32) being cylindrical and forming a peripheral shank surface (44); and
a switching arrangement (46) located at the peripheral shank surface (44) and comprising two circumferentially spaced apart circumferential outer portions (48a, 48b) and a circumferential inner portion (50) extending therebetween, one of either the circumferential inner portion (50) or the two circumferential outer portions (48a, 48b) being conductive and the other one of either the circumferential inner portion (50) or the two circumferential outer portions (48a, 48b) being non-conductive; wherein:

the shank portion (32) is located in the clamping recess (68) of the holding device (58).

14. The cutting tool (20), according to claim 13, wherein:
the cutting tool (20) is adjustable between a first state and a second state;
in the first state of the cutting tool (20):
the cutting member (22) is oriented in a first rotated position about the cutting member longitudinal axis (A);
the switch member contact surfaces (92) are electrically connected to one another by whichever one of the inner and two circumferential outer portions (48a, 48b) is conductive so that the two conductive switch members (90a, 90b) are in electrically conductive communication with each other; and
the electric switch (88) is closed, the electric circuit (80) is established and the indictor (84) is on; and
in the second state of the cutting tool (20):
the cutting member (22) is oriented in a second rotated position about the cutting member longitudinal axis (A), the first and second rotated positions being different from each other;
at least one of the two conductive switch members (90a, 90b) is spaced apart from whichever one of the inner and two circumferential outer portions (48a, 48b) is conductive so that the switch member contact surfaces (92) are not electrically connected to one another so that the two conductive switch members (90a, 90b) are not in electrically conductive communication with each other; and
the electric switch (88) is open, the electric circuit (80) is broken and the indicator (84) is off.

15. The cutting tool (20), according to claim 14, wherein:
the circumferential inner portion (50) is conductive and the two circumferential outer portions (48a, 48b) are non-conductive;
in the first state of the cutting tool (20), the two switch members (90a, 90b) both contact the circumferential inner portion (50); and
the first state of the cutting tool (20) indicates rotational alignment between the cutting member (22) and the holding device (58).

16. The cutting tool (20), according to claim 14, wherein:
the circumferential inner portion (50) is non-conductive and the two circumferential outer portions (48a, 48b) are conductive;
in the first state of the cutting tool (20), the two switch members (90a, 90b) both contact one of the two circumferential outer portions (48a, 48b); and
the first state of the cutting tool (20) indicates rotational non-alignment between the cutting member (22) and the holding device (58).

17. The cutting tool (20), according to claim 14, wherein:
the two conductive switch members (90a, 90b) are angularly spaced apart about the recess central axis (C) by a switch member circumferential angle ($\beta$);
the circumferential inner portion (50) subtends an inner portion angle ($\alpha$) at the cutting member longitudinal axis (A);
the switch member circumferential angle ($\beta$) is less than the inner portion angle ($\alpha$); and
the first state tolerance angle ($\theta$) has a value equal to the inner portion angle ($\alpha$) minus the switch member circumferential angle ($\beta$).

18. The cutting tool (20), according to claim 14, wherein:
in the second state of the cutting tool (20):

at least one of the two conductive switch members (90*a*, 90*b*) is in entire contact with whichever one of the inner and two circumferential outer portions (48*a*, 48*b*) is non-conductive.

19. The cutting tool (20), according to claim 13, wherein: the circumferential inner portion (50) is conductive and the two circumferential outer portions (48*a*, 48*b*) are non-conductive.

20. The cutting tool (20), according to claim 13, further comprising a conductive substrate (52) and a non-conductive external element (54) formed on part of the conductive substrate (52) wherein:
the conductive substrate (52) forms the circumferential inner portion (50) and the non-conductive external element (54) forms the two circumferential outer portions (48*a*, 48*b*); or
the conductive substrate (52) forms the two circumferential outer portions (48*a*, 48*b*) and the non-conductive external element (54) forms the circumferential inner portion (50).

21. The cutting tool (20), according to claim 20, wherein the non-conductive external element (54) is a coated layer formed on part of the conductive substrate (52).

22. The cutting tool (20), according to claim 20, wherein the conductive substrate (52) is formed from steel.

23. The cutting tool (20), according to claim 20, wherein:
the peripheral shank surface (44) comprises a peripheral groove (56); and
the non-conductive external element (54) located in the peripheral groove (56).

24. The cutting tool (20), according to claim 13, wherein the circumferential inner portion (50) is elongated and extends in a direction from one of cutting member end surfaces (40*a*, 40*b*) towards the other.

25. The cutting tool (20), according to claim 24, wherein the circumferential inner portion (50) extends parallel to the cutting member longitudinal axis (A).

26. The cutting tool (20), according to claim 24, wherein the circumferential inner portion (50) does not extend to the cutting member end surface (40*b*) located at the shank portion (32).

27. The cutting tool (20), according to claim 13, wherein:
the circumferential inner portion (50) subtends an inner portion angle ($\alpha$) at the cutting member longitudinal axis (A); and
the inner portion angle ($\alpha$) is greater than or equal to 5° and less than or equal to 10°.

28. The cutting tool (20), according to claim 13, wherein the cutting member (22) comprises an additional switching arrangement (46) located at the peripheral shank surface (44), such that the cutting member (22) has two switching arrangements (46) which are rotationally offset from each other about the cutting member longitudinal axis (A).

29. The cutting tool (20), according to claim 28, wherein the two switching arrangements (46) are rotationally offset from each other about the cutting member longitudinal axis (A) by 180°.

30. The cutting tool (20), according to claim 13, wherein: the two circumferential outer portions (48*a*, 48*b*) comprise:
a rotationally preceding circumferential outer portion (48*a*) extending from the circumferential inner portion (50) in the rotationally preceding direction ($D_P$); and
a rotationally succeeding circumferential outer portion (48*b*) extending from the circumferential inner portion (50) in the rotationally succeeding direction ($D_S$); wherein:
the rotationally preceding circumferential outer portion (48*a*) and the rotationally succeeding circumferential outer portion (48*b*) intersect each other distal the circumferential inner portion (50).

31. The cutting tool (20), according to claim 13, wherein:
the cutting member (22) is releasably clamped in the clamping recess (68) of the clamping sleeve adaptor (60) of the holding device (58); and
the alignment indicator (76) is detachable from the clamping sleeve adaptor (60).

* * * * *